April 16, 1940. H. A. NONEMAKER ET AL 2,197,731
SYNCHRONIZATION OF TRACTION WHEELS OF LOCOMOTIVES AND THE LIKE
Filed Sept. 8, 1938 4 Sheets-Sheet 1
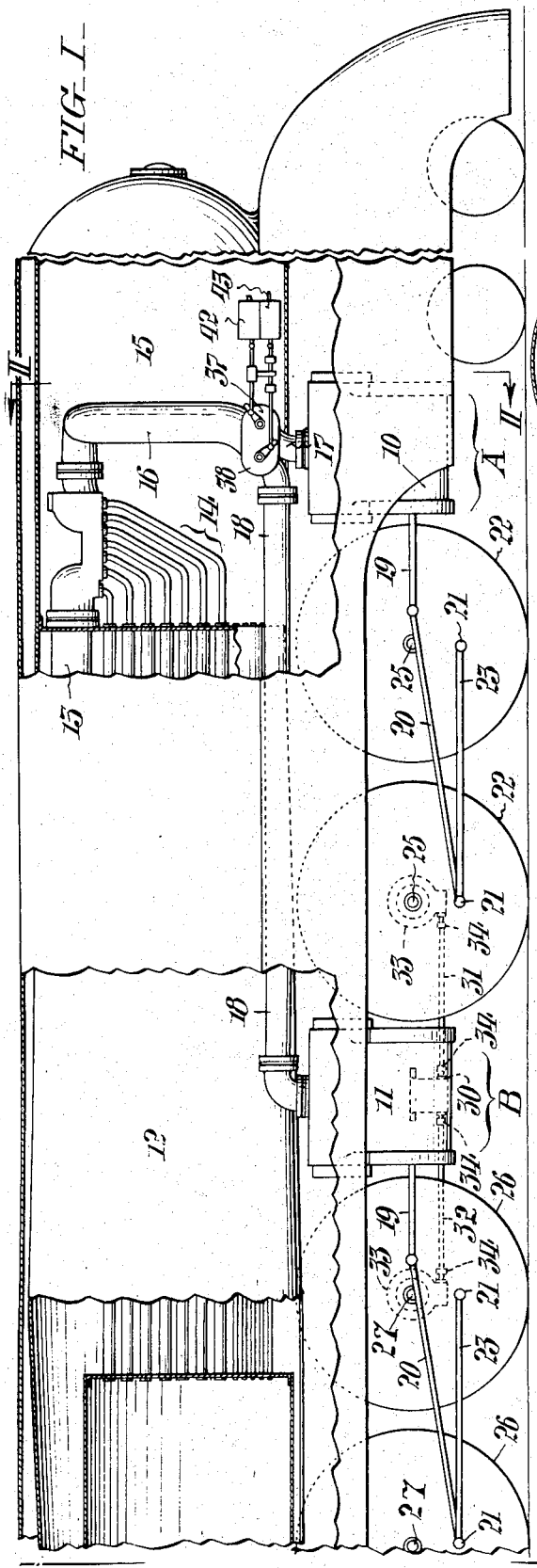
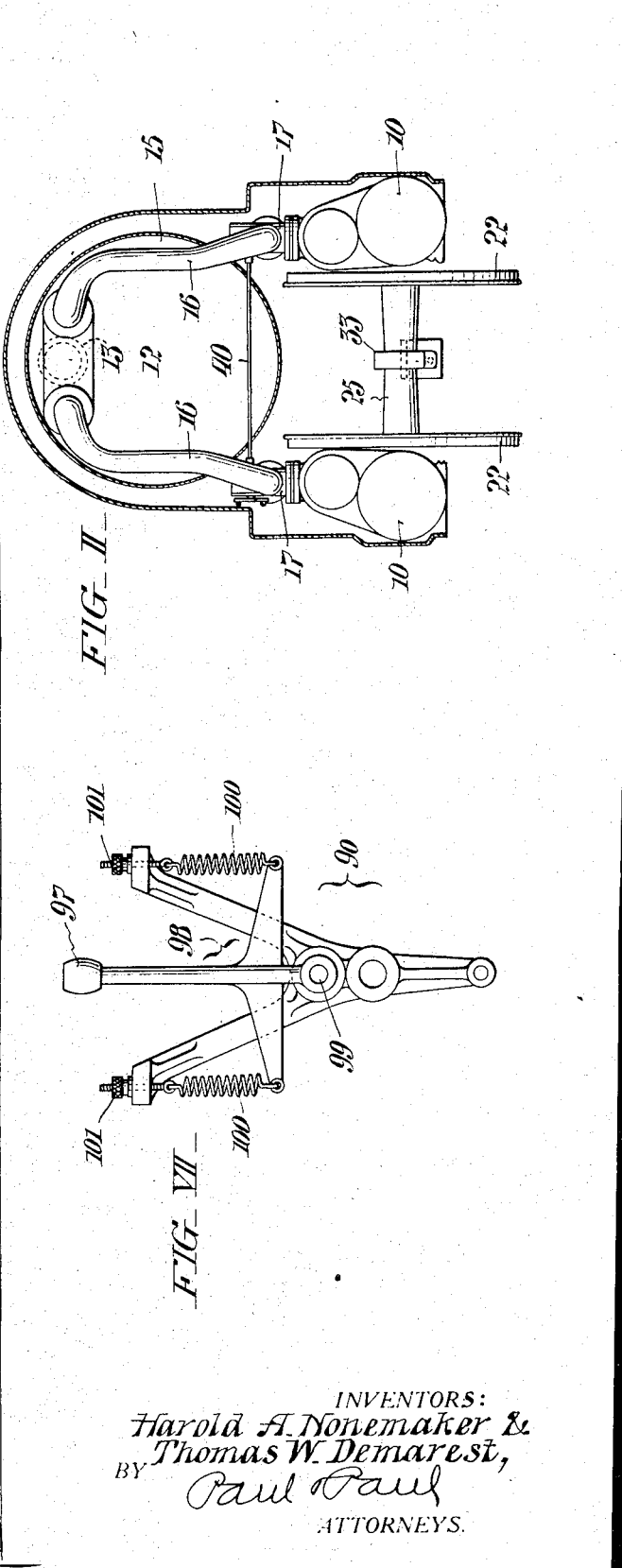
INVENTORS:
Harold A. Nonemaker &
Thomas W. Demarest,
BY Paul & Paul
ATTORNEYS.

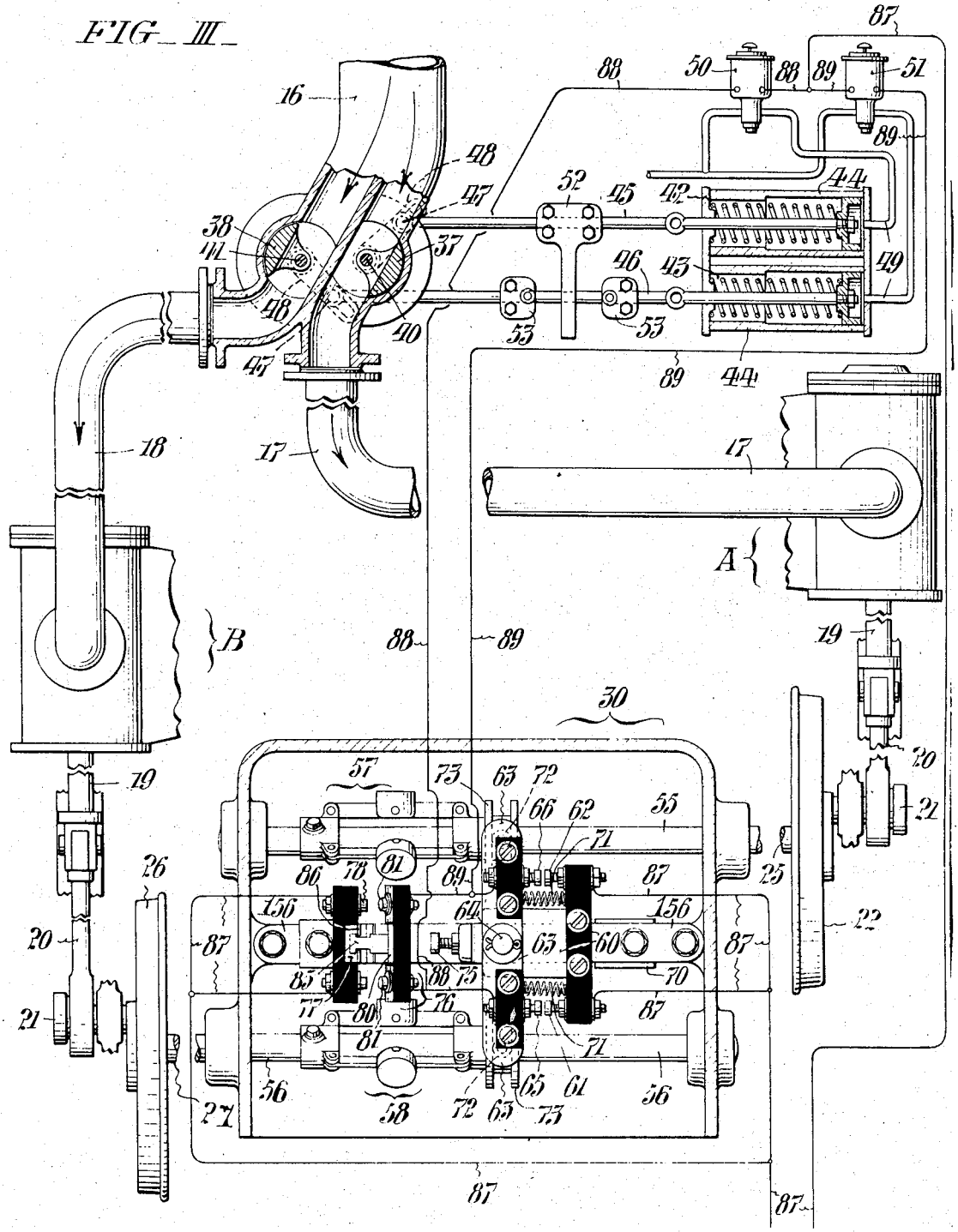

April 16, 1940. H. A. NONEMAKER ET AL 2,197,731
SYNCHRONIZATION OF TRACTION WHEELS OF LOCOMOTIVES AND THE LIKE
Filed Sept. 8, 1938    4 Sheets-Sheet 3
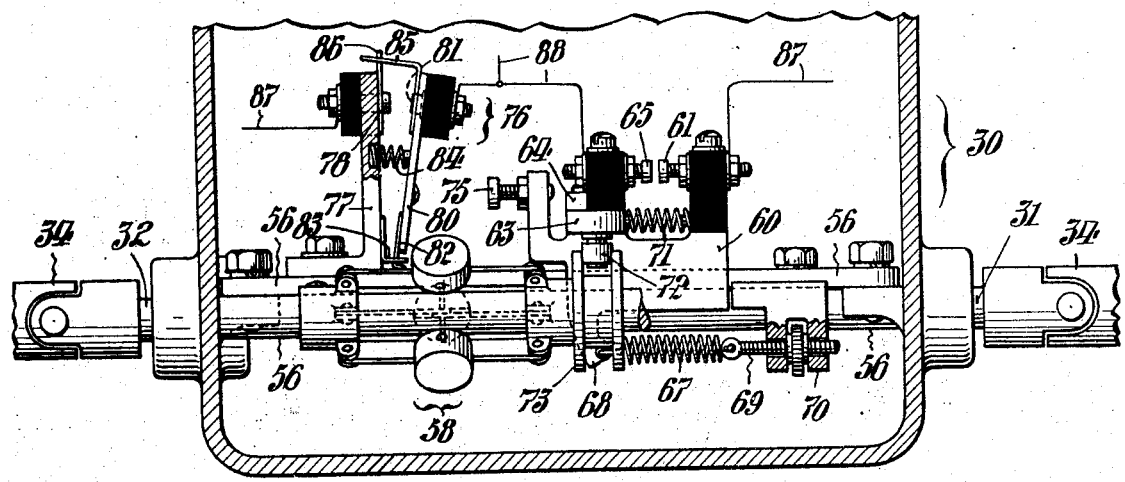
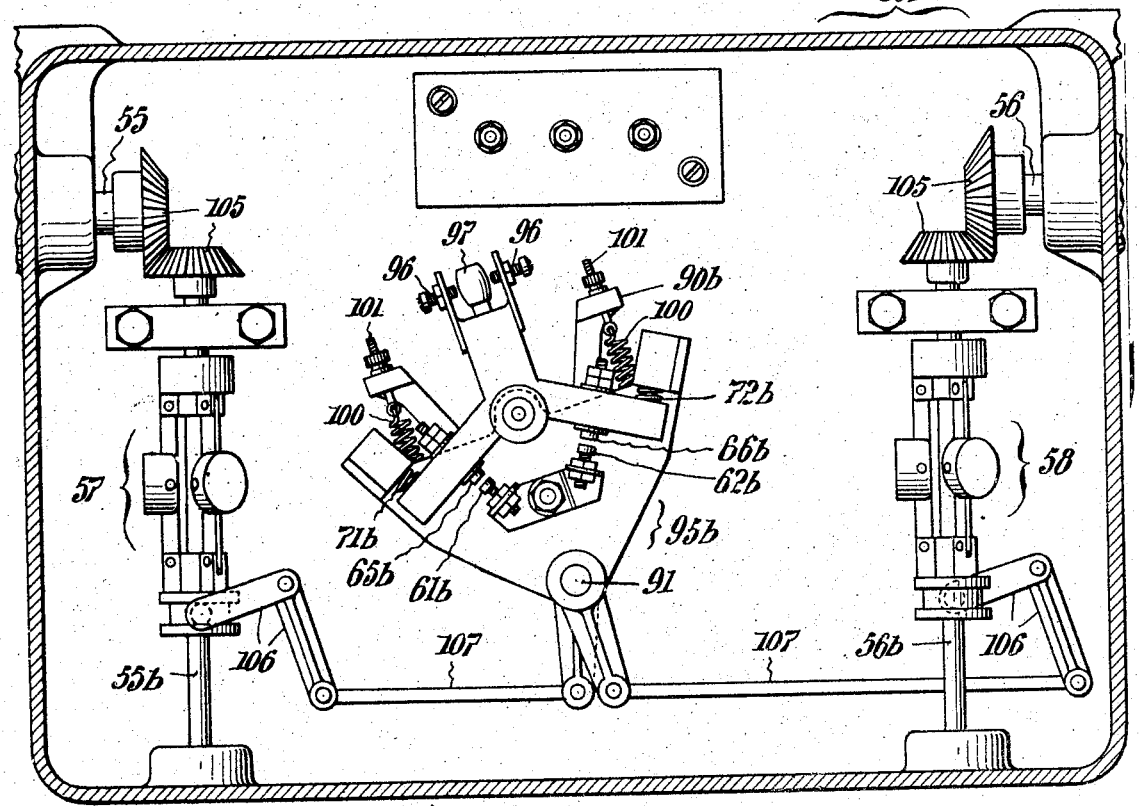
WITNESSES:
INVENTORS:
Harold A. Nonemaker &
Thomas W. Demarest,
BY
ATTORNEYS.

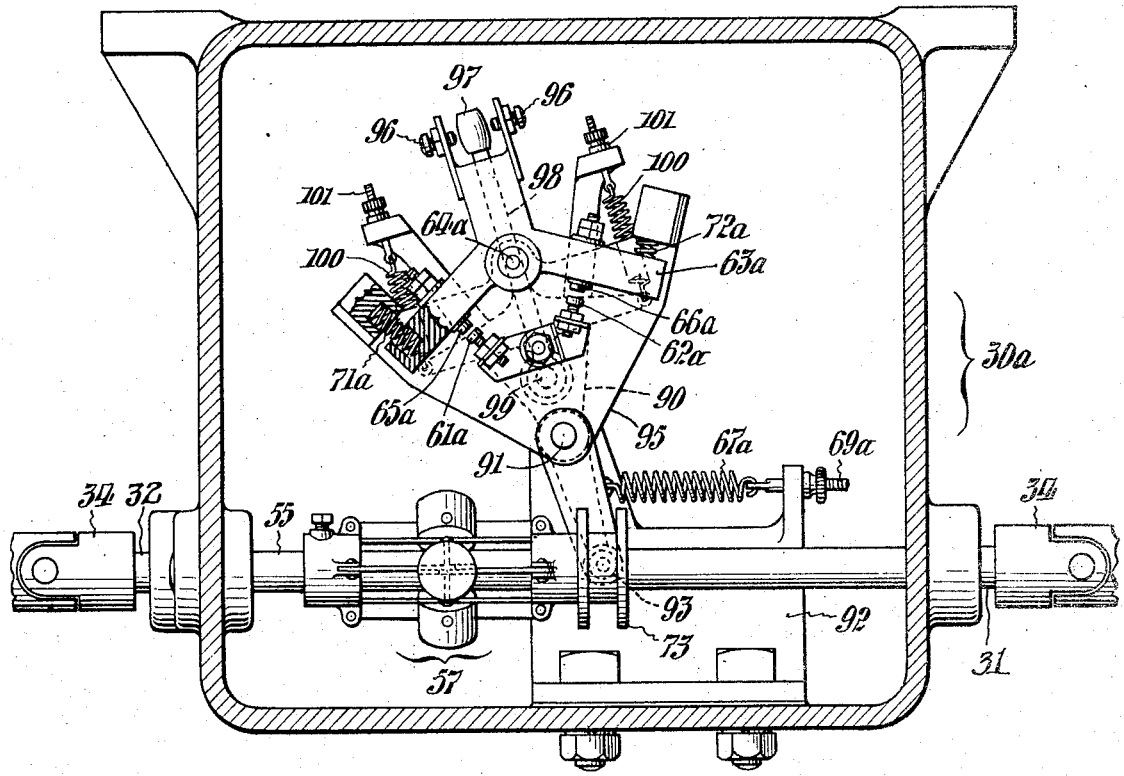
FIG-V
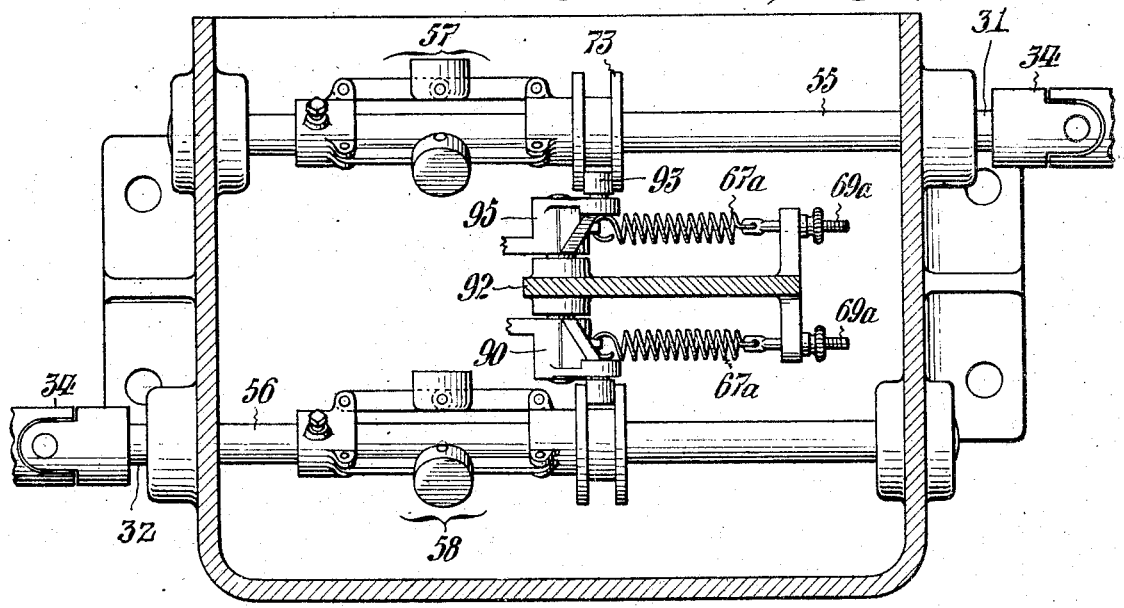
FIG-VI

Patented Apr. 16, 1940

2,197,731

UNITED STATES PATENT OFFICE 2,197,731

SYNCHRONIZATION OF TRACTION WHEELS OF LOCOMOTIVES AND THE LIKE

Harold A. Nonemaker, Narberth, Pa., and Thomas W. Demarest, Onley, Va., assignors to The Pennsylvania Railroad Company, Philadelphia, Pa., a corporation of Pennsylvania Application September 8, 1938, Serial No. 228,896

11 Claims. (Cl. 105—48)

This invention relates to the synchronization of traction wheels, particularly the driving wheels of steam or electric locomotives; and its general purpose is to prevent or minimize wheel slippage in traction units. Wheel slippage may occur either from rail conditions or from the application of power in such sudden or excessive amounts as to overcome the static friction of the drivers with the rails,—the adhesive weight of the traction unit, in other words. Such slippage is accompanied by racing of the power unit (engine or motor) and drivers involved, which may result in localized wear or "burning" of the rails, excessive wear of drivers, great waste of power, and even in damage to the racing power unit.

In modern traction units of large tractive power, matters are often complicated by the use of several more or less independent power units driving independent pairs, sets, or groups of interconnected drive wheels. In an electric locomotive, for example, the drive wheels on the several axles may be entirely unconnected, and driven by separate motors, each of which is in effect an independent power unit. Or in a multipower-unit steam locomotive, each power unit may comprise a cylinder or pair of cylinders with a piston or pistons connected to drive a pair of drivers fixed on a common axle, or several such pairs of drivers interconnected by side rods. In such a case, slippage and racing may involve both or either one of the power units and sets of drivers; but even if only one unit slips, it robs the other of steam and makes it ineffective toward starting or accelerating the traction unit.

When slippage and racing occur, the power applied is in all cases reduced as promptly as possible, by manual operation of the throttle, electric controller, or the like, quite aside from such ameliorative measures as track sanding, which may be carried out either manually or automatically. This, however, involves objectionable lapse of time, waste of power, and possibilities of damage.

We aim to accomplish the reduction of power to obviate slippage and racing automatically, and preferably with such promptitude as to terminate them while only incipient: i. e., before the excessive speed of the power unit involved attains a degree which would ordinarily be reached in racing, and before damage or any considerable waste of power can occur. We also aim to provide against secondary racing of a power unit as a result of its receiving a surplus of power when the supply to the initially racing unit is reduced.

For the purposes of our invention, we provide speed responsive devices or governors driven by the several power units, together with means actuated differentially by the governors, in response to any material slippage and racing, to reduce the supply of energy to the racing power unit or units until overspeeding of such unit or units ceases. Thus the action is primarily dependent on relative overspeeding as between the power units, rather than on the absolute speed of the units. Preferably, we also provide for reducing the energy supply to the other power unit whenever it is reduced to an initially racing unit, as well as for concurrently reducing the supply of energy to both units if they should start to race concurrently. While we prefer to operate the differentially acting governors at the same speed when the power units driving them are not racing, yet they may equally well be arranged to operate at quite different corresponding speeds (when there is no slippage or racing), provided they are of such designs that their operating characteristics are essentially alike over their corresponding speed ranges.

The invention is applicable to various types of traction units or locomotives, including ordinary steam locomotives equipped with a booster, as well as steam locomotives with several sets of main cylinders, and electric locomotives with several motors driving independent axles or groups of wheels. Various features and advantages of our invention (besides those hereinbefore indicated) will appear from the following description of species or forms of embodiment, and from the drawings. All the features and combinations shown or described are of our invention, so far as novel over the prior art.

In the drawings, Fig. I is a partial side view of a streamlined locomotive with two sets of cylinders and drive wheels, illustrating the application of our invention thereto, portions of the outer streamlined casing being broken away, as well as the cab and the whole rear of the locomotive, and a portion of the boiler shell at the smoke box being also broken away or in section.

Fig. II shows a vertical section through the locomotive, taken as indicated by the line and arrows II—II in Fig. I.

Fig. III is a general view, partly diagrammatic or schematic, illustrating the application of our invention to a steam locomotive, either such as shown in Fig. I, or of any other type. In this view, various parts are shown in section, and other parts are broken out and removed.

Fig. IV is a view of the governor mechanism shown in Fig. III from the front of that figure, the enclosing casing being shown in section and its upper portion being broken away, and driving connections like those in Figs I and II being shown.

Fig. V is a side view of another form of governor mechanism, with its enclosing casing in section; Fig. VI is a bottom plan view of the same governor mechanism, also with the casing in section as indicated by the line and arrows VI—VI in Fig. V; and Fig. VII is a side view of certain parts that are shown in Fig. V, by themselves.

Fig. VIII is a side view of yet another form of governor mechanism, its enclosing casing being shown in section.

Figs. I and II illustrate the application of our invention to a steam locomotive of known type having two power units or engines A and B, comprising pairs of cylinders 10 and 11 respectively. As here shown, the two pairs of cylinders 10 and 11 are supplied with steam from the locomotive boiler 12 through a dry pipe 13; a superheater 14, mounted in the smoke box 15 and in some of the boiler flues; and a steam pipe 16 with branches to both sides of the locomotive. Each of the branch pipes 16 in turn divides into a branch 17 leading to one of the forward cylinders 10, and a branch 18 leading to one of the rear cylinders 11. The piston rods 19 from the forward cylinders 10 are connected through connecting rods 20 and crank pins 21 to driving wheels 22, which are in turn connected to other driving wheels 22 through side rods 23 and crank pins 21. The pairs of driving wheels 22, 22 and 22, 22 are fast on the axles 25, 25, and the crank pins 21 at opposite sides of the locomotive may be set 90° apart, as usual. The rear cylinders 11 drive similar pairs of driving wheels 26, 26 and 26, 26 on axles 27 through similar connections, which are marked with the same reference characters to avoid repetitive description. It will be seen, therefore, that the locomotive has separate power units or engines A and B and distinct sets or groups of driving wheels independently driven thereby: viz., the power unit A comprising the forward cylinders 10, 10 and driving the wheels 22, and the power unit B comprising the rear cylinders 11, 11, and driving the wheels 26.

For the purposes of our invention, the power units A and B are shown connected to a governor mechanism 30, in a suitable casing under the locomotive, by means of longitudinal shafts 31, 32 driven from the axles 25 of drive wheels 22 and 26 which are associated with the forward and rear power units A, B through reduction gearing enclosed in gear boxes 33 mounted on said axles. Universal joints 34 are preferably included in the shafts 31, to take care of relative motion or slight misalinement of the parts. The governor mechanism 30 may control and regulate the supplies of steam to the power units A, B by means of valves 37, 38 interposed in the pipes 17, 18 where the pipes lie side by side in the smoke box 15. As shown in Figs. I, II, and III, the valves 37, 38 are of rotary type; the corresponding valves 37, 37 at opposite sides of the locomotive are interconnected by a shaft 40 on which they are mounted; and the corresponding valves 38, 38 at opposite sides are in like manner interconnected by a shaft 41. Preferably, the valves 37, 38 are operated by fluid under pressure controlled electrically by the governor mechanism 30.

For operating the valves 37, 38, there are shown power cylinders 42, 43 whose pistons are urged to the right (Fig. III) by helical compression springs 44 in the cylinders, and whose piston rods are connected by link rods 45, 46 and crank pins 47 to slotted crank arms 48 on the shafts 40, 41. The slots in the crank arms 48 permit of adjusting the radial positions of the crank pins 47 and the range or extent of movement of the valves 37, 38. Pressure fluid, such as compressed air supplied through piping 49 from the air-brake system of the locomotive, may be admitted to the right-hand ends of the cylinders 42, 43, and exhausted therefrom, by electro-magnetically-operated pilot valves 50, 51, such as well known in the art. For a purpose that will appear hereinafter, the rod 45 carries a crosshead 52 adjustably clamped thereto, and adapted to engage rollers on stop blocks 53, 53 adjustably clamped on the rod 46.

It is to be understood that Fig. III is a simplified diagrammatic view wherein various parts are marked with the same reference characters as in Figs. I and II, though more or less arbitrarily arranged, and wherein connection of the axles 25, 27 of driving wheels 22, 26 driven by different power units A, B to the governor mechanism 30 is arbitrarily indicated by alinement of these axles 25, 27 with the governor shafts 55, 56. In Fig. IV, on the other hand, the shafts 31 of Fig. I, with their universal joints 34, are shown for driving the governor shafts 55, 56. As shown in Figs. III and IV, a guide and supporting bar 156 extends across the governor casing between and parallel with the shafts 55, 56, which carry speed-responsive devices such as fly-ball governors 57, 58. A cross-head 60 slidable along the guide bar 156 carries fixed but adjustable contact screws 61, 62, besides a "floating" rocker lever 63 pivoted thereon at 64 and provided with adjustable contact screws 65, 66 for coacting with the contacts 61, 62, respectively. The cross-head 60 is biased to the right, against the centrifugal pull of the governors 57, 58, by a helical tension spring 67 acting between a depending lug 68 on the cross-head and an eye-bolt 69 adjustable in a bracket 70 bolted to the lower side of the bar 156. The bracket 70 also serves as a stop to limit movement of the cross-head 60 to the right by the spring 67. Helical compression springs 71, 71 acting between the cross-head 60 and the rocker 63, and having their ends engaged around projections on the parts 60 and 63, tend to keep the rocker in mid-position, as shown in Fig. III, with both contacts 65, 66 disengaged from the contacts 61, 62. The ends of the rocker 63 (Fig. IV) are connected to the governors 57, 58 by rollers 72, 72 on said lever that engage in the grooves of the movable collars 73, 73 of the governors 57, 58.

The cross-head 60 also carries an adjustable abutment screw 75 for coacting with a switch mechanism 76 fixed on the bar 56, and comprising an upright bracket support 77 with contacts 78, 79 insulatively mounted thereon, and a movable member 80 having coacting contacts 81, 81 insulatively mounted thereon, and fulcrumed or pivoted on the support 77 by means of a sheet metal hook 82 engaged in a slot in a sheet metal bracket 83 at the base of the support 77. A helical compression spring 84 engaged in a socket in the support 77 and around a projection on the member 80 urges the latter away from the former as far as permitted by a stop connection consisting of a T-headed sheet metal bracket 85 on the upper end of the member 80 whose reduced shank engages in the notched upper end of a plate 86 projecting from the upper end of the support 77, thus keeping the contacts 81, 81 normally out of engagement with the contacts 78, 78.

As shown in Fig. III, one side of the electric current supply circuit 87 has parallel branches connected to the contacts 61, 62 and 78, 78, while the other side of this circuit has parallel branches 88, 89 which include the operating coils of the valves 50, 51 controlling the valves 37, 38, respectively, and which are connected to contacts 65, 81 and 66, 81, respectively. On a steam locomotive, a suitable source of current supply for the circuit 87 is the usual steam-driven turbine-generator set (not shown) that furnishes electricity for the locomotive headlight, etc.

As long as there is no material slippage of driving wheels 22, 26, the power units A, B run at the same speed, and so likewise do the governors 57, 58 driven by them. As this speed increases, the governors 57, 58 pull the rocker lever 63 and the cross-head 60 bodily to the left in Fig. III; but the rocker 63 nevertheless remains in mid-position, so that none of the contacts come together, and neither of the circuits 88, 89 controlling the valves 50, 51 and 37, 38 is closed. If, however, the drivers 22 start to slip, and the power unit A starts to race, the governor 57 speeds up and swings the rocker 63 counter-clockwise, bringing the contact 61 against the contact 65 to close the circuit 88 and thus operate the steam valve 37 to reduce the speed of the power unit A. When the valve 37 is thus partially or even wholly closed to reduce the supply of steam to the power unit A, the cross-head 52 on its operating rod 45 engages the roller on one of the stop blocks 53 and correspondingly closes the valve 38, thereby reducing or throttling the supply of steam to the power unit B, so as to prevent its drivers 26 from slipping. This is desirable because when valve 37 is closed, the whole steam supply from the boiler 12 becomes available in the power unit B. Or if the drivers 26 start to slip, the governor 58 speeds up and swings the lever 63 clockwise, closing the circuit 89 and operating the steam valve 38 to reduce the speed of the power unit B, in like manner. When the valve 38 is thus partially or even wholly closed, the roller on the other stop block 53 on the operating rod 46 engages the cross-head 52 and correspondingly closes the valve 37 to prevent racing of the power unit A. Whenever the speed governors 57, 58 are again in synchronism, the rocker lever 63 returns to its mid-position shown in Fig. III, breaking the corresponding circuit 88 or 89, closing the corresponding pilot valve 50 or 51, and allowing one or both valves 37, 38 to reopen.

If both sets of drive wheels 22 and 26 slip simultaneously, the speed governors 57, 58 acting together draw rocker lever 63 and cross-head 60 further and further to the left in Fig. III without bringing together contacts 61 and 65 or 62 and 66. However, before the concurrent slippage and racing of the drivers 22, 26 and power units A, B becomes at all serious, the abutment 75 on cross-head 60 will engage switch member 80 and bring the two contacts 81, 81 against the contacts 78, 78, thus closing the two circuits 88, 89 and partially or even wholly closing both valves 37, 38 simultaneously, and holding them closed as long as the racing continues.

Figs. V, VI, and VII illustrate a different form of governor mechanism 30a, in which the speed governor 57 is connected to operate a Y-armed rocker actuator 90, pivoted on one end of a short pivot 91 fixed in a bracket support 92 between the shafts 55, 56, by means of a roller 93 mounted on the lower arm of the rocker 90 and engaged in the groove of the governor collar 73; and the governor 58 is similarly connected to operate a Y-armed switch rocker 95, pivoted on the other end of the pivot 91. Helical tension springs 67a, 67a connected to the lower arms of the rockers 90 and 95 are anchored to the bracket 92 by eye-bolts 69a adjustable relative thereto. These springs 67a, 67a not only answer the general purpose of the spring 67 in Fig. IV, but also serve as a means of calibrating the operating characteristics of the governors 57, 58 as desired, and of making them exactly alike.

As shown in Figs V and VII, the main switch rocker 95 carries adjustable contact screws 61a, 62a, insulatively mounted thereon, and also a three-armed "floating" rocker 63a, preferably of insulating material, like Bakelite, pivoted thereon at 64a and provided with contacts 65a, 66a for coacting with the contacts 61a, 62a, respectively. Helical compression springs 71a, 72a acting between the rockers 95 and 63a, and having with their ends engaged in socket recesses in these rockers, tend to keep the rocker 63a in mid-position on the rocker 95, as shown in Fig. V, with both contacts 65a, 66a disengaged from the contacts 61a, 62a. The upper arm of the rocker 63a carries opposed adjustable abutment screws 96, 96 for coacting with the head part 97 on the actuator rocker 90. Preferably, the head 97 is not integral with the main portion of the rocker 90, but is part of a three-armed rocker 98 pivoted on the rocker 90 at 99, and normally held in mid-position relative to the rocker 90 by helical tension springs 100, 100 connected between the lateral arms of the rockers 98 and 90. The tension of the springs 100, 100 may be adjusted by means of anchorage eye-bolts 101, 101 that take through lugs on the arms of the rocker 90. The yielding connection of the rocker 98 to the rocker 90 allows the head 97 to yield relative to the rocker 90, after engagement of the contacts 61a and 65a or 62a and 66a, if the governor action should be sufficiently powerful to require such yielding to protect the parts from excessive stress. The contacts 61a, 62a may be connected to one side of the current supply circuit 87, and the contacts 65a, 66a may be connected to parallel branches 88, 89 of the other side of this circuit, all essentially as in Fig. III.

The operation of this governor mechanism 30a is, briefly, that when either governor 57 or 58 outspeeds the other, it swings the corresponding rocker 90 or 95 clockwise in Fig. V and brings one or the other pair of contacts 61a and 65a or 62a and 66a into engagement to close one or the other of the circuits 88 or 89, with the same results as already described in connection with Figs. III and IV.

Fig. VIII illustrates a modified form of governor mechanism 30b in which the governor shafts 55b, 56b are arranged upright and driven through bevel gearing 105 from the shafts 55, 56, and the governors 57, 58 are connected through rockers 106, 106 and link rods 107, 107 to the rockers 90b and 95b. The parts associated with the rockers 90b and 95b are the same as those already described in connection with Figs. V, VI and VII.

In Figs. V, VI, and VII, various parts and features are marked with the same reference numerals as corresponding ones in Figs. I–IV (with added letters, where such distinction appears necessary), as a means of dispensing with repetitive description; and so like in Fig. VIII the same reference characters as in Figs. I-VII are used, with addition of distinctive letters where needful.

Having thus described our invention, we claim:

1. The combination with a locomotive or traction unit comprising separate power units and distinct sets of driving wheels independently driven thereby, with means for supplying energy to said power units, of speed-responsive devices also driven by the several power units, and a differential power-control mechanism operatively connected to said speed-responsive devices and including parts shifted with respect to one another by the said devices in response to overspeeding of one power unit relative to another, and thereby coacting to reduce the supply of energy to the overspeeding power unit.

2. The combination with a locomotive or traction unit comprising separate power units and distinct sets of driving wheels independently driven thereby, with means for supplying energy to said power units, of speed-responsive devices also driven by the several power units, and means cooperatively operated by said speed-responsive devices and differentially responsive to overspeeding of either power unit relative to the other to reduce the supply of energy thereto, and common means also controlled by both of said speed-responsive devices for reducing the supply of energy in response to concurrent overspeeding of both of said power units and sets of driving wheels.

3. The combination with a locomotive or traction unit comprising separate power units and distinct sets of driving wheels independently driven thereby, with means for supplying energy to said power units, of speed-responsive devices also driven by the several power units, means cooperatively operated by said speed-responsive devices and differentially responsive to overspeeding of either power unit relative to the other to reduce the supply of energy thereto, and means responsive to reduction of the power supply to one power unit by said last-mentioned means for partially reducing that to the other power unit.

4. The combination with a locomotive or traction unit comprising separate power units and distinct sets of driving wheels independently driven thereby, with means for supplying energy to said power units, of speed-responsive devices also driven by the several power units, electric circuits controlling the supplies of energy to said power units, and a differential switch mechanism operatively connected to said speed-responsive devices and including parts shifted with respect to one another by the said devices in response to overspeeding of one power unit relative to another, and thereby coacting to control the energization of the aforesaid circuits and thus to reduce the supply of energy to the overspeeding power unit.

5. The combination with a locomotive or traction unit comprising separate power units and distinct sets of driving wheels independently driven thereby, with means for supplying energy to said power units, of speed-responsive devices also driven by the several power units; electric circuits controlling the supplies of energy to said power units; a differential switch mechanism operatively connected to said speed-responsive devices and including parts shifted with respect to one another by the said devices in response to overspeeding of one power unit relative to another, and thereby coacting to control the energization of the aforesaid circuits and thus to reduce the supply of energy to the overspeeding power unit; and common means also controlled by said speed-responsive devices for concurrently controlling the energization of the several circuits aforesaid in response to concurrent overspeeding of power units, and thus concurrently reducing the supplies of energy to said units.

6. The combination with a locomotive or traction unit comprising separate fluid-driven power units and distinct sets of driving wheels independently driven thereby, with means for supplying motive fluid to said power units, of speed-responsive devices also driven by the several power units, electric circuits controlling the supplies of energy to said power units, and a differential switch mechanism operatively connected to said speed-responsive devices and including parts shifted with respect to one another by the said devices in response to overspeeding of one power unit relative to another, and thereby coacting to control the energization of the aforesaid circuits and thus to reduce the supply of motive fluid to the overspeeding power unit.

7. The combination with a locomotive or traction unit comprising separate power units and distinct sets of driving wheels independently driven thereby, with means for supplying energy to said power units, of speed-responsive devices with substantially parallel shafts driven by the several power units, a floating rocker connected to said speed-responsive devices and carrying contacts, a movable member whereon said rocker is fulcrumed having contacts for coacting with those of said rocker, and electric circuits alternatively closable by said contacts in response to overspeeding of one or the other power unit, and controlling the supplies of energy to the latter.

8. The combination with a locomotive or traction unit comprising separate fluid-driven power units and distinct sets of driving wheels independently driven thereby, with means for supplying motive fluid to said power units, of speed-responsive devices also driven by the several power units, valve means controlling the supplies of motive fluid to said power units, and a differential valve-operating mechanism operatively connected to said speed-responsive devices and including parts shifted with respect to one another by the said devices in response to overspeeding of one power unit relative to another, and thereby coacting to actuate the valve means for the overspeeding power unit to reduce its motive fluid supply.

9. The combination with a locomotive or traction unit comprising separate fluid driven power units and distinct sets of driving wheels independently driven thereby, with means for supplying motive fluid to said power units, of speed-responsive devices also driven by the several power units, valve means controlling the supplies of motive fluid to said power units operated by said speed-responsive devices and responsive to overspeeding of either power unit to reduce the supply of motive fluid thereto, and means responsive to closing movement of one of said valve means for partially closing the other of said valve means.

10. The combination with a locomotive or traction unit comprising separate fluid-driven power units and distinct sets of driving wheels independently driven thereby, with means for supplying motive fluid to said power units, of speed-responsive devices also driven by the several power units; electric circuits and valve means for controlling the supplies of motive fluid to said power units; a differential switch mechanism operatively connected to said speed-responsive devices and including parts shifted with respect to one another by the said devices in response to overspeeding of one unit relative to another, and thereby coacting to control the energization of the aforesaid circuits; and means for operating said valve means, in response to the operation of said switch mechanism as aforesaid by said speed-responsive devices, to reduce the supplies of motive fluid to the power units.

11. The combination with a locomotive or traction unit comprising separate fluid-driven power units and distinct sets of driving wheels independently driven thereby, with means for supplying motive fluid to said power units, of speed-responsive devices also driven by the several power units, electric circuits and valve means for controlling the supplies of motive fluid to said power units, switches for controlling the energization and de-energization of said circuits cooperatively operated by said speed-responsive devices and differentially responsive to overspeeding of either power unit relative to the other, means for operating said valve means in response to energization and de-energization of said circuits to reduce the supplies of motive fluid to the power units, and means responsive to closing movement of one of said valve means for partially closing the other of said valve means.

HAROLD A. NONEMAKER.
THOMAS W. DEMAREST.